June 17, 1958     C. E. NORDSTROM     2,838,828

BURRING TOOL

Filed Dec. 3, 1953

INVENTOR
CARL E. NORDSTROM

BY Emery Robinson
ATTORNEY

# United States Patent Office 2,838,828
Patented June 17, 1958

2,838,828

BURRING TOOL

Carl E. Nordstrom, Evanston, Ill., assignor to Teletype Corporation, Chicago, Ill., a corporation of Delaware Application December 3, 1953, Serial No. 395,944

2 Claims. (Cl. 29—103)

This invention relates to cutting tools and more particularly to tools such as end mills which have their cutting elements on the end surfaces thereof.

In the manufacture of certain piece parts in large numbers and according to exacting tolerances, one of the most tedious and one of the most time consuming operations is the clean removal of burrs without disturbing the main body of the part. For example, in the manufacture of complicated machines such as typewriters, calculators, perforators and printing telegraph apparatus it is necessary to manufacture large numbers of pilot pins and set screws whose end surfaces must be perfectly flat and whose length dimension must be held to a narrow tolerance. Therefore, it is desirable to remove cleanly all projections that extend from the end surfaces of these pins and screws without taking a cut from the end surface itself.

At the present time a great portion of pins and screws are formed from rod stock in automatic screw machines. It is well known that the development of undesirable projections or burrs upon the piece part is inherent in such a method of manufacture and that a scheme for the economical and clean removal thereof is constantly being sought.

An undesirable projection which invariably develops upon the piece part at the cutoff operation, and referred to hereinafter as the cutoff burr, has been removed heretofore by a costly hand grinding operation. Therefore, it is a feature of the present invention to eliminate this secondary grinding operation by the provision of an attachment to a conventional automatic screw machine in the form of a spindle for housing a cutter which cleanly removes cutoff burrs from piece parts without disturbing the surface area surrounding the burr.

An object of the present invention is to provide a self limiting cutting tool.

A further object of the present invention is to provide an end cutting tool having a perfectly flat end surface.

A tool illustrating certain features of the invention may comprise a cylinder having a central bore, an end face of the cylinder lying wholly within a plane perpendicular to the axis of the cylinder and said end face being cut by a plurality of slots, said slots communicating with the bore and progressively deepening in the direction of the periphery of the cylinder, a plane developed by one side of each of said slots forming an acute angle with the plane of said end face so as to develop a plurality of cutting edges.

Other objects of the invention will be apparent from the following description and the accompanying drawings wherein.

Figure 1:
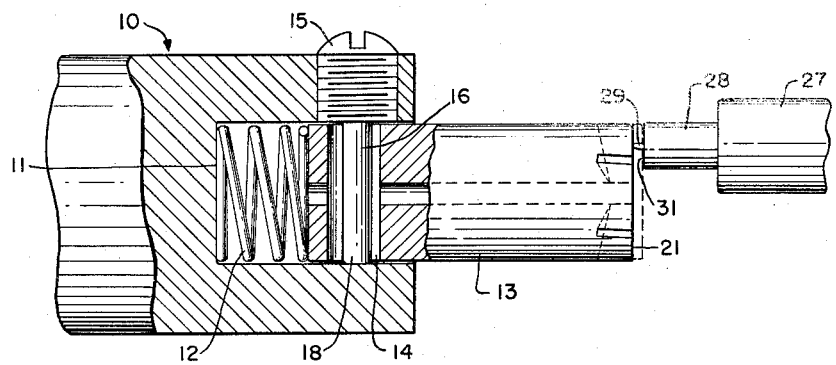
Fig. 1 is a side view of a spindle for receiving the tool with parts broken away.
Figure 2:
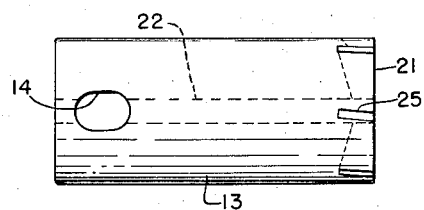
Fig. 2 is a side view of the tool.

As shown in the attached drawing, the reference numeral 10 designates a rotatable head having a recess 11 therein for housing a coiled spring 12. Slidably positioned in the recess 11 and abutting the spring is a cylindrical tool 13 having a transverse, oval slot 14. In threaded engagement with the housing 10 is a screw 15. Integral with the screw 15 is an elongated pin 16 for engaging the slot 14 thereby limiting the advance of the cutting tool 13 into and out of the recess 11. The pin 16 abuts the housing 10 at 18.

Figure 3:
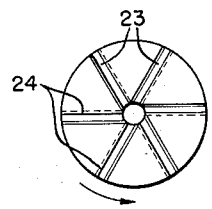
Fig. 3 is a view of the right side of Fig. 2.
Figure 4:
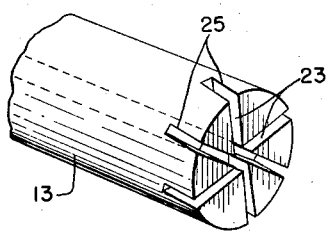
Fig. 4 is an isometric view of the tool.

As is apparent in Fig. 4, the face 21 of the tool 13 is completely flat and is perpendicular to the axis of the cutter. Communicating with a central bore 22 are six slots 23 as shown in Fig. 3. The slots 23 are of such a configuration that the depth thereof increases as in the direction of the periphery of the cutter. Each slot has a radial cutting edge 24 formed where one lateral surface of the slot 23 intersects the face 21 at an angle less than ninety degrees.

Referring now to Fig. 1 there is shown a pickup arm 27 adapted to grasp and present a piece part 28 having a cutoff burr 29 to the tool 13. The part 28 is pressed firmly against the tool 13 causing it to move into the recess 11 against the spring 12. The work 28 is offset with respect to the central axis of the tool 13 so that upon rotation of the tool in the direction shown, cutting edges 24 shear across the face of the burr 29 shaving chips therefrom. The spring 12 constantly urges the tool 13 into the part 28 and cutting will occur progressively until the face 21 of the cutting tool abuts the end surface 31 of the piece part. When the face 21 and the surface 31 abut, the tool 13 will be in the dotted line position shown in Fig. 1. It is to be noted that there is no clearance or "back-off" provided behind the cutting edges 24 as is the case with most end cutting tools. It is to be further understood that the slots 23 should be at least as wide as the diameter of the burr 29 so that while the tool is being rotated and urged to the right the slots 23 may receive a portion of the burr therein. This action results in a continual shaving of the burr as the cutting edges sweep past the burr until the surfaces 21 and 31 ultimately abut. After the abutment of said surfaces, continued rotation of the tool and continued urging of the tool to the right will not result in the removal of additional metal from the piece part. Since the slots 23 are not of sufficient width to permit the entry of the main body of the piece part therein and since there is no cutting clearance formed behind each cutting edge the cutting action of the tool 13 stops automatically when the surfaces 21 and 31 meet. The central bore 22 is provided in order to facilitate the forming of the slots 23. The slots are progressively deepened in th direction of the periphery of the tool in order to facilitate and encourage the discharge of chips.

It is to be noted that this cutting tool may be sharpened readily simply by skimming the end surface thereof with a surface grinder. Sharpening may be accomplished repeatedly and is limited only by the depth of the slots 23.

It is not intended that the scope of this invention be restricted to the removal of cutoff burrs but that it extend to uses wherein it is desired to remove projections or burrs cleanly from a plane surface without disturbing said plane surface.

It it to be understood that the above-described arrangement is simply illustrative of the application of the principles of this invention. Numerous other arrangements may be readily devised by those skilled in the art which will embody the principles of the invention and fall within the spirit and scope thereof.

What is claimed is:

1. A cutting tool for removing a projection from a work piece, which comprises a cylinder having a central bore, and end face of the cylinder lying wholly within a plane perpendicular to the axis of the cylinder and the end face being cut by a plurality of slots which communicate with the bore and deepen progressively in the direction of the periphery of the cylinder, a plane developed by one side of each of the slots forming an acute angle with the plane of the end face such that a plurality of radial cutting edges are developed thereby, a housing having a recess formed therein, means for securing the cylinder within the recess such that relative rotation therebetween is prevented but limited longitudinal movement of the cylinder is permitted, and a spring mounted within the recess for urging the cylinder from the recess and toward the work piece as the projection is removed therefrom.

2. A cutting tool for removing a projection from a flat surface without removing any of the surface, which comprises a cylindrical member having one end surface lying wholly within a plane perpendicular to the axis of the cylindrical member and a circular bore formed longitudinally therethrough, a rotatable head having a recess formed therein for receiving the cylindrical member, a helical spring positioned within the recess for urging the cylindrical member therefrom, a rod securing the cylindrical member within the recess and preventing relative rotative movement between the cylindrical member and the head but permitting limited longitudinal movement therebetween, and a plurality of slots formed in the end surface of the cylindrical member such that a plane developed by one side of each of the slots forms an acute angle with the plane of the end surface and develops a plurality of radial cutting edges, the width of the slots being greater than the width of the projection to be removed from the flat surface but less than the width of the surface, and the depth of the slots increasing in the direction of the periphery of the cylinder.

References Cited in the file of this patent

UNITED STATES PATENTS

| | | |
|---|---|---|
| 1,296,154 | Atchison | Mar. 4, 1919 |
| 1,424,392 | Baker et al. | Aug. 1, 1922 |
| 1,516,268 | Drissner | Nov. 18, 1924 |
| 1,516,269 | Drissner | Nov. 18, 1924 |
| 1,883,567 | Christman | Oct. 18, 1932 |
| 2,206,770 | Drummond | July 2, 1940 |
| 2,273,624 | Campbell et al. | Feb. 17, 1942 |
| 2,337,797 | Brackett | Dec. 28, 1943 |
| 2,385,474 | Schulz | Sept. 25, 1945 |
| 2,493,039 | Sochia | Jan. 3, 1950 |

FOREIGN PATENTS

| | | |
|---|---|---|
| 423,913 | Germany | Jan. 16, 1926 |

OTHER REFERENCES

Article, "A Problem in Cutting Tools," vol. 37, No. 3, American Machinist.